US011589035B1

(12) United States Patent
Lin

(10) Patent No.: US 11,589,035 B1
(45) Date of Patent: Feb. 21, 2023

(54) DYNAMIC DEFECT DETECTION AND CORRECTION FOR QUADRA IMAGE SENSORS

(71) Applicant: Apple Inc., Cupertino, CA (US)

(72) Inventor: Sheng Lin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/578,334

(22) Filed: Jan. 18, 2022

(51) Int. Cl.
*H04N 17/00* (2006.01)
*G06T 5/00* (2006.01)
*G06T 7/00* (2017.01)
*H04N 5/367* (2011.01)
*H04N 9/04* (2006.01)

(52) U.S. Cl.
CPC .......... *H04N 17/002* (2013.01); *G06T 5/001* (2013.01); *G06T 7/0002* (2013.01); *H04N 5/3675* (2013.01); *H04N 9/0451* (2018.08); *G06T 2207/10024* (2013.01); *G06T 2207/30168* (2013.01)

(58) Field of Classification Search
None
See application file for complete search history.

(56) References Cited

U.S. PATENT DOCUMENTS

| 10,984,504 B2 | 4/2021 | Oh et al. |
| 2006/0233439 A1 | 10/2006 | Zhao |
| 2010/0026862 A1* | 2/2010 | Nishiwaki .......... H04N 9/04557 348/246 |
| 2021/0297607 A1 | 9/2021 | Wang et al. |

* cited by examiner

*Primary Examiner* — Mark T Monk
(74) *Attorney, Agent, or Firm* — Fenwick & West LLP

(57) ABSTRACT

Embodiments relate to correcting pixels of images captured using a quadra image sensor. A defect detection circuit analyzes the pixels in the captured image and determines whether a pixel is defective. The defect detection circuit generates a first defect indication by determining whether pixel data of a pixel under test is brighter or darker by a first threshold value than pixel data of pixels in pixel tiles surrounding the pixel tile corresponding to the pixel under test. Moreover, the defect detection circuit generates a second defect indication by determining whether pixel data of the pixel under test is brighter or darker by a second threshold value than pixel data of other pixels in the pixel tile corresponding to the pixel under test. Using the first and second defect indications, the defect detection circuit identifies whether the pixel data of the pixel under test is defective.

26 Claims, 13 Drawing Sheets

DYNAMIC DEFECT DETECTION AND CORRECTION FOR QUADRA IMAGE SENSORS

BACKGROUND

1. Field of the Disclosure

The present disclosure relates a circuit and process for processing images and more specifically to detecting and correcting defects in an image captured by an image sensor operating in quadra mode.

2. Description of the Related Arts

A quadra configuration for an image sensor increases the pixel density of the image sensor without increasing the density of the color filter used with the image sensor. Specifically, a quadra image sensor includes a set of pixel tiles, each having a set of pixels corresponding to the same color. This defines four color channels for each color of the color filter. As such, the complexity for processing the pixels of an image captured with a quadra image sensor increases compared to an image sensor that does not use pixel tiles. This can lead to increased processing time for processing the pixels of images captured by a quadra image sensor, and increased complexity in the circuitry for processing the pixels of images captured by a quadra image sensor. Moreover, image processing techniques used for images captured using image sensors that do not employ pixel tiles may not be suitable (or may not translate easily) for images captured using image sensors having pixel tiles.

SUMMARY

Embodiments relate to correcting pixels of images captured using a quadra image sensor. A defect detection circuit analyzes the pixels in the captured image and determines whether a pixel is defective. The defect detection circuit generates a first defect indication by determining whether pixel data of a pixel under test is brighter or darker by a first threshold value than pixel data of pixels in pixel tiles surrounding the pixel tile corresponding to the pixel under test. Moreover, the defect detection circuit generates a second defect indication by determining whether pixel data of the pixel under test is brighter or darker by a second threshold value than pixel data of other pixels in the pixel tile corresponding to the pixel under test. Using the first and second defect indications, the defect detection circuit identifies whether the pixel data of the pixel under test is defective.

BRIEF DESCRIPTION OF THE DRAWINGS

Figure (FIG. 1 is a high-level diagram of an electronic device, according to one or more embodiments FIG. 2 is a block diagram illustrating components in the electronic device, according to one or more embodiments.

Figure 1:
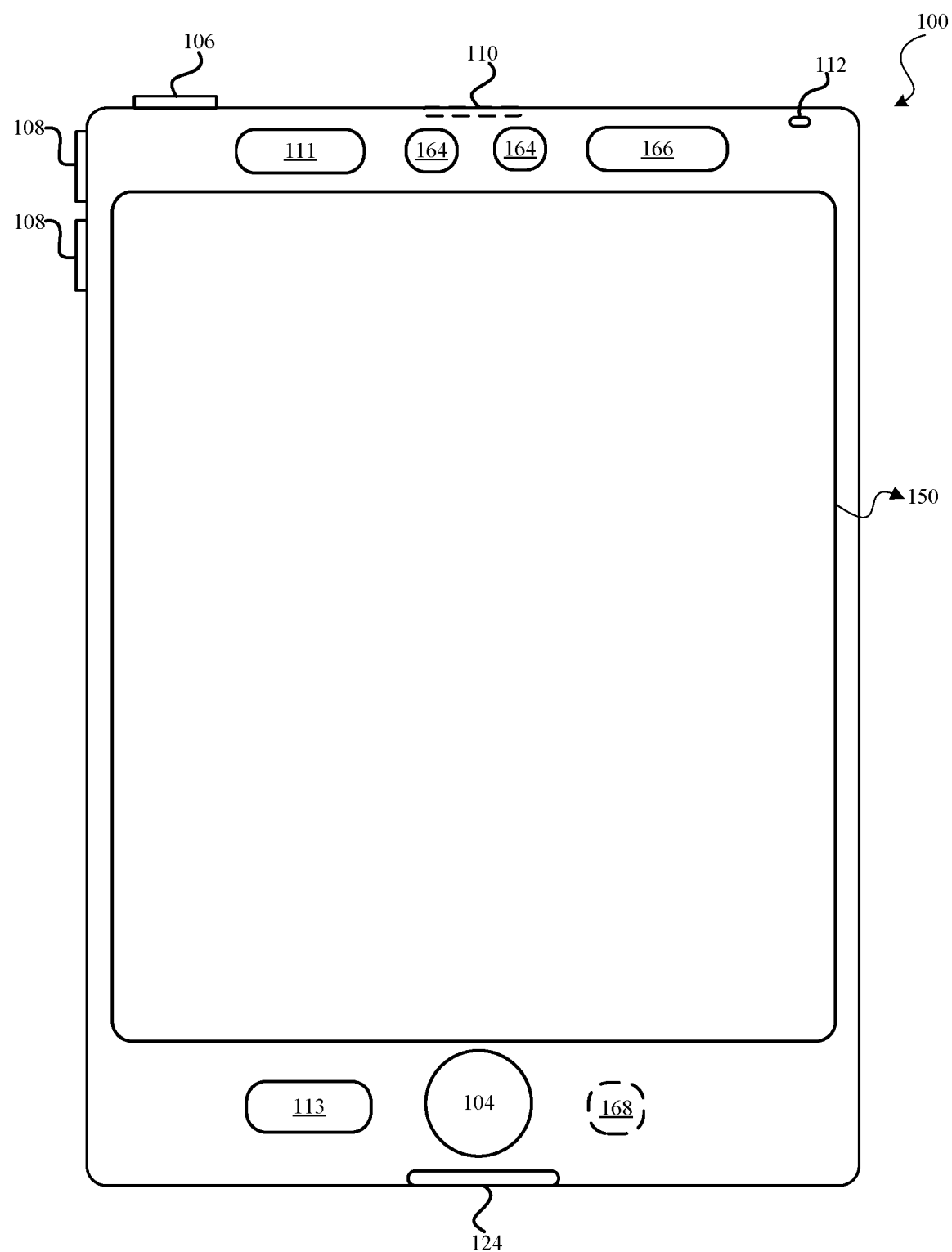

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a circuit for correcting pixels of images captured using a quadra image sensor. A quadra image sensor includes a set of pixel tiles, each having a set of pixels corresponding to the same color. The circuit includes a defect detection circuit and a defect correction circuit. The circuit generates a first defect indication by determining whether pixel data of a pixel under test is brighter or darker by a first threshold value than pixel data of pixels in surrounding pixel tiles. Moreover, the circuit generates a second defect indication by determining whether pixel data of the pixel under test is brighter or darker by a second threshold value than pixel data of other pixels in the same pixel tile as the pixel under test. Using the first and second defect indications, the circuit identifies whether the pixel under test is defective. Moreover, the circuit computes a set of gradient values, each based on pixel data for a corresponding set of pixels surrounding the pixel under test. The circuit identifies an interpolation direction based on the computed set of gradient values and corrects the pixel data of the pixel under test by interpolating pixel data of pixels selected based on the identified interpolation direction. In some embodiments, the circuit further corrects the pixel data of the pixel under test based on a linear filter correction value determined based on a combination of pixels surrounding the pixel under test and selected based on the position of the pixel under test.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one or more embodiments. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
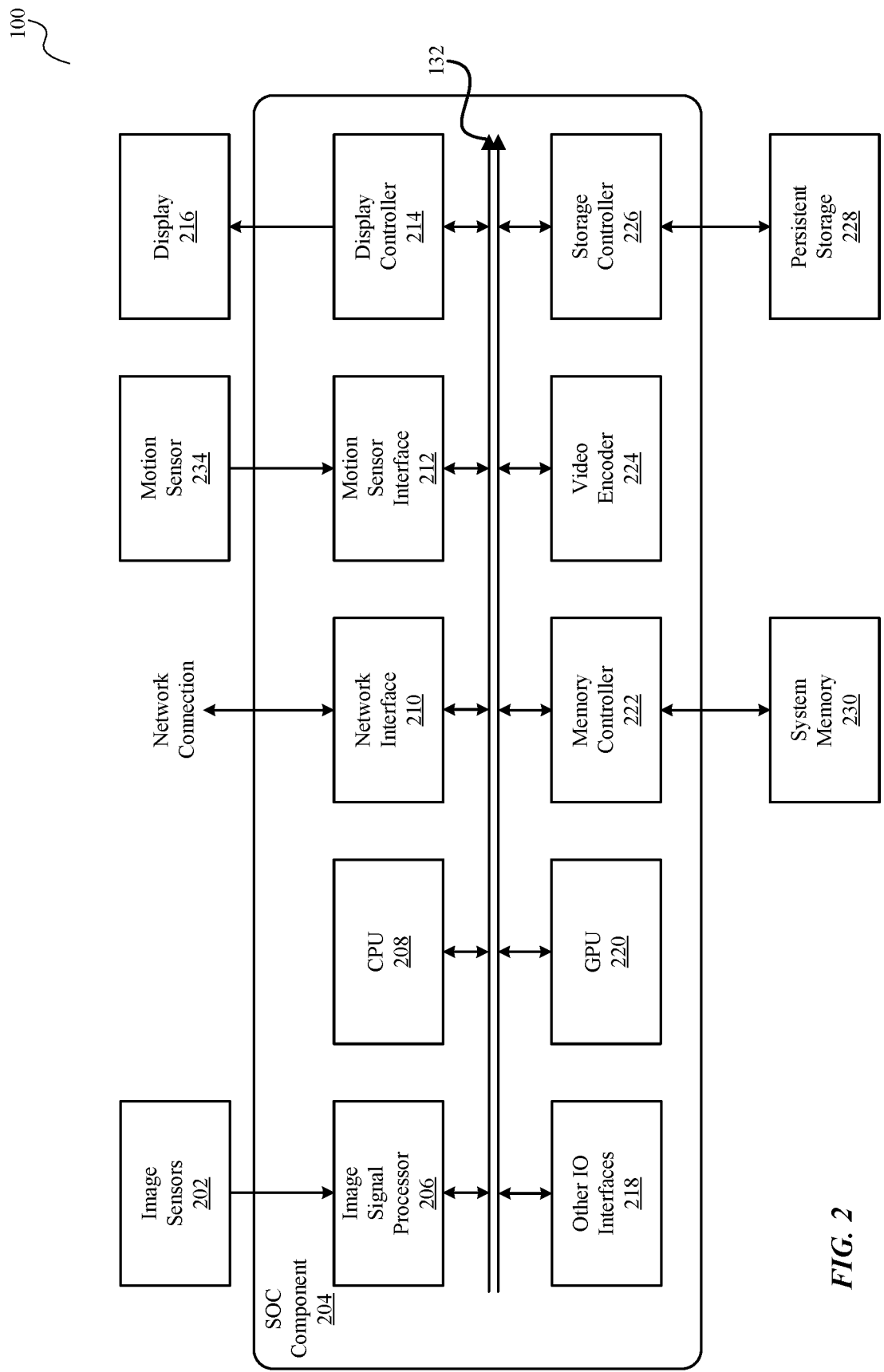

FIG. 2 is a block diagram illustrating components in device 100, according to one or more embodiments. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
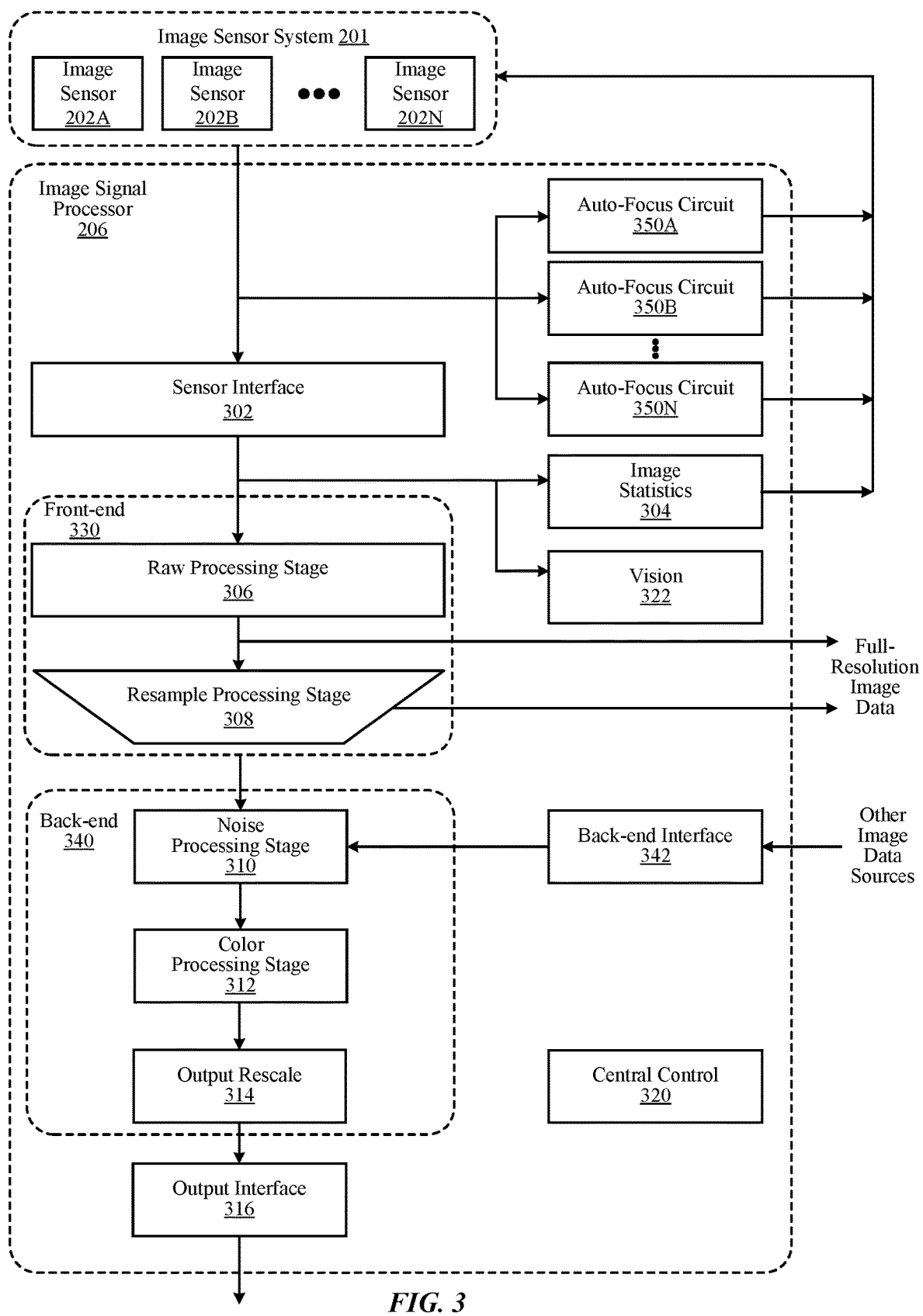
FIG. 3 is a block diagram illustrating image processing pipelines implemented using an image signal processor, according to one or more embodiments.

FIG. 3 is a block diagram illustrating image processing pipelines implemented using ISP 206, according to one or more embodiments. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamlessly transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Quadra Image Sensor

Figure 4:
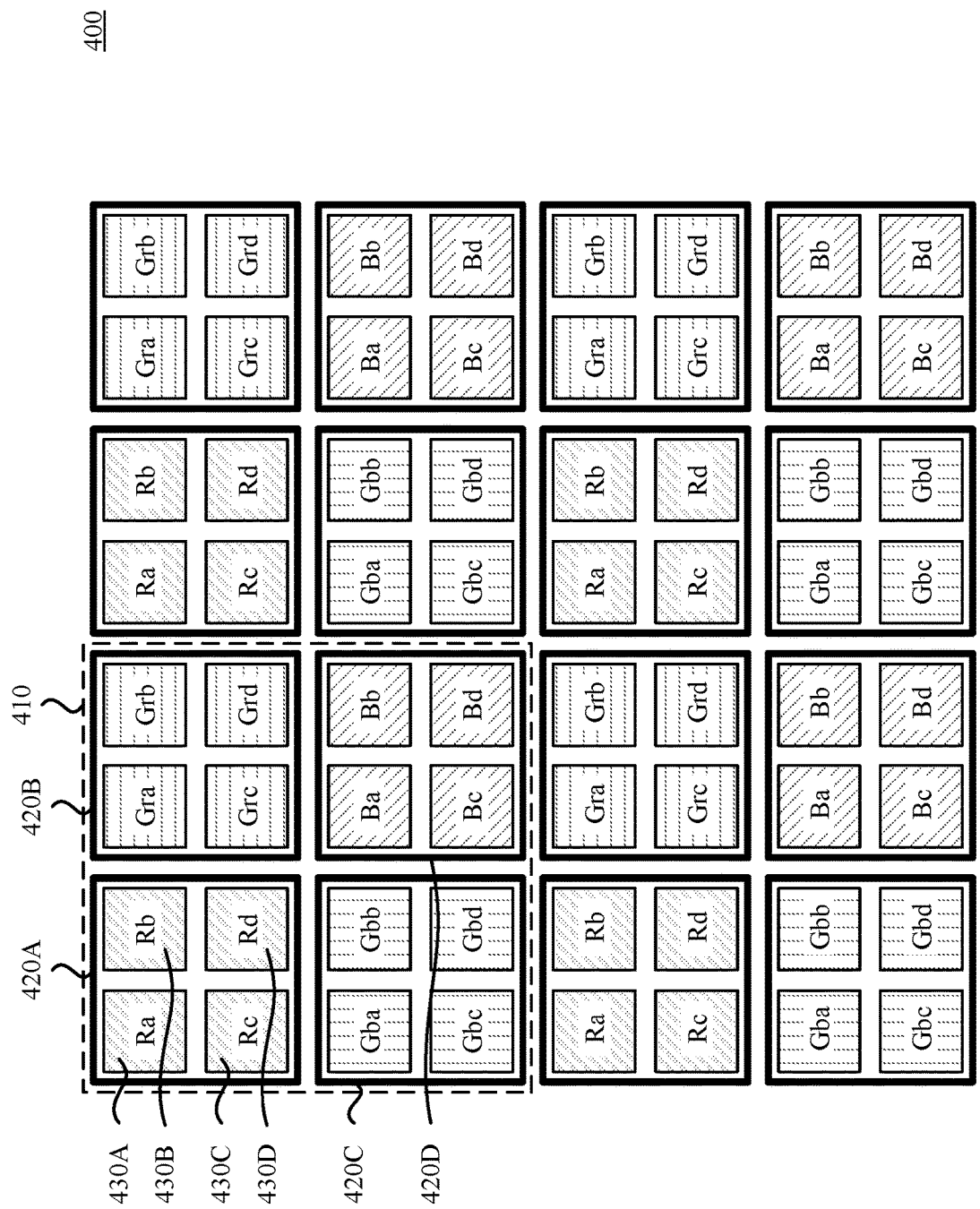
FIG. 4 is a block diagram of a quadra image sensor (also referred to as quad-Bayer image sensor), according to one or more embodiments.

FIG. 4 is a block diagram of a quadra image sensor 400 (also referred to as quad-Bayer image sensor), according to one or more embodiments. The image sensor 400 includes a mosaic of color filters that is configured to filter the light being captured by an array of light sensors. For example, the image sensor 400 may include a first set of color filters that allow red light to pass through (red color filters), a second set of color filters that allow blue light to pass through (blue color filters), and a third set of color filters that allow green light to pass through (green color filters). In some embodiments, the image sensor may include additional or fewer types of color filters.

In a quadra image sensor, each color filter is configured to filter light being captured by multiple light sensors. For example, each color filter is configured to filter light being captured by four light sensors, forming a two-by-two tile.

The example image sensor of FIG. 4 includes a set of pixel blocks 410, each having a set of color filters 420, and a set of light sensors 430 each corresponding to a pixel of an output image. For example, each pixel block 410 includes a red color filter 420A, a first green color filter 420B, a second green color filter 420C, and a blue color filter 420D.

The red color filter 420A is disposed over four light sensors 430. That is, the red color filter 420A overlaps with four light sensors 430. Specifically, the red color filter 420 is disposed over a first light sensor 430A, a second light sensor 430B, a third light sensor 430C, and a fourth light sensor 430D. A such, the first light sensor 430A forms a first red pixel channel Ra, the second light sensor 430B forms a second red pixel channel Rb, the third light sensor 430C forms a third red pixel channel Rc, and the fourth light sensor 430D forms a fourth red pixel channel Rd.

In some embodiments, the second light sensor 430B for the second red pixel channel Rb is next to the first light sensor 430A for the first red pixel channel Ra along a first direction, the third light sensor 430C for the third red pixel channel Rc is next to the first light sensor 430A for the first red pixel channel Ra along a second direction. In some embodiments, the first direction is orthogonal to the second direction. Moreover, in some embodiments, the fourth light sensor 430D for the fourth red pixel channel Rd is arranged at a location diagonal from the first light sensor 430A for the first red pixel channel Ra. In some embodiments, the fourth light sensor 430D for the fourth red channel Rd is next to the second light sensor 430B for the second red pixel channel Rb along the second direction, and next to the third light sensor 430C for the third red pixel channel Rc along the first direction.

The first green color filter 420B is disposed over four light sensors 430. That is, the first green color filter 420B overlaps with four light sensors 430. The first light sensor overlapping the first green color filter forms a first green pixel channel Gra, the second light sensor overlapping the first green color filter forms a second green pixel channel Grb, the third light sensor overlapping the first green color filter forms a third green pixel channel Grc, and the fourth light sensor overlapping the first green color filter forms a fourth green pixel channel Grd.

The second green color filter 420C is disposed over four light sensors 430. That is, the second green color filter 420C overlaps with four light sensors 430. The first light sensor overlapping the second green color filter forms a first green pixel channel Gba, the second light sensor overlapping the second green color filter forms a second green pixel channel Gbb, the third light sensor overlapping the second green color filter forms a third green pixel channel Gbc, and the fourth light sensor overlapping the second green color filter forms a fourth green pixel channel Gbd.

The blue color filter 420D is disposed over four light sensors 430. That is, the blue filter 420D overlaps with four light sensors 430. The first light sensor overlapping the blue color filter forms a first blue pixel channel Ba, the second light sensor overlapping the blue color filter forms a second blue pixel channel Bb, the third light sensor overlapping the blue color filter forms a third blue pixel channel Bc, and the fourth light sensor overlapping the blue color filter forms a fourth blue pixel channel Bd.

Example Architecture for Processing Defective Pixels

Figure 5:
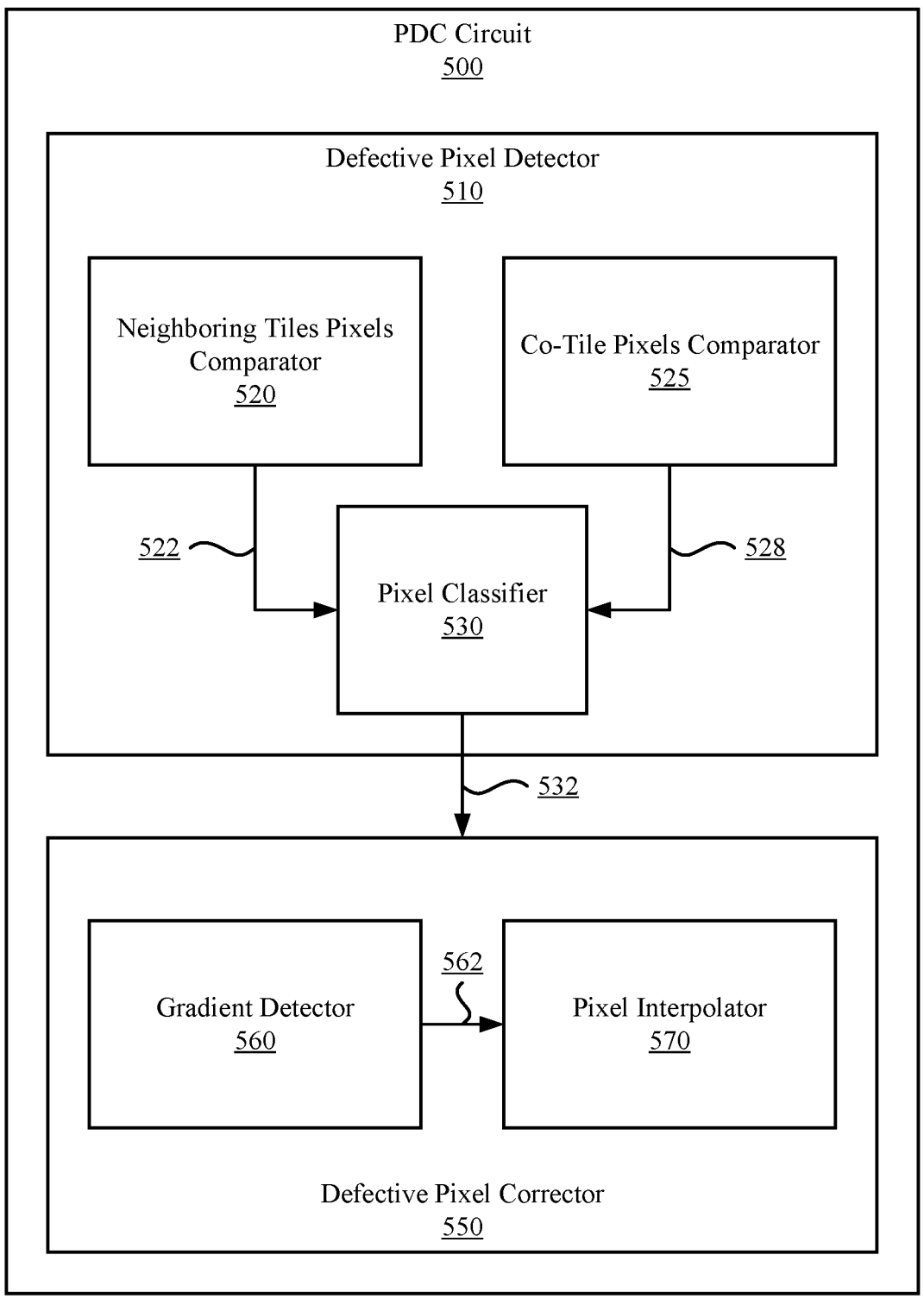
FIG. 5 is a block diagram of a pixel defect correction (PDC) circuit 500, according to one or more embodiments.

FIG. 5 is a block diagram of a pixel defect correction (PDC) circuit 500, according to one or more embodiments. The PDC circuit 500 may be part of the raw processing stage 306. As mentioned above with reference to FIG. 3, the raw processing stage 306 performs various operations using the raw image data, including defective pixel correction. The operations for correcting defective pixels include detecting defective pixels within the raw image data, and calculating a corrected value for the detected defective pixel.

In one embodiment, the PDC circuit 500 includes a defective pixel detector 510 and a defective pixel corrector 550. The defective pixel detector 510 determines whether a pixel in a raw image is defective and the defective pixel corrector 550 determines a pixel value for pixels that were identified as being defective by the defective pixel detector 510.

The defective pixel detector 510 includes a neighboring tiles pixels comparator 520, a co-tile pixels comparator 525, and a pixel classifier 530. The neighboring tiles pixels comparator 520 is a circuit that compares a pixel under test to pixels in neighboring tiles. In some embodiments, the neighboring tiles pixels comparator 520 compares the pixel under test to pixels of neighboring tiles of the same color as the pixel under test. That is, if the pixel under test is a red (R) pixel, the pixel under test is compared to other pixels in neighboring red pixel tiles. Similarly, if the pixel under test is a blue (B) pixel, the pixel under test is compared to other pixels in neighboring blue pixel tiles. In some embodiments, the PDC circuit 500 treats pixels corresponding to first green color filter 420B (i.e., Gr pixels) as a different color than pixels corresponding to the second green color filter 420C (i.e., Gb pixels). As such, if the pixel under test is a Gr pixel, the pixel under test is compared to other pixels in neighboring Gr pixel tiles. Similarly, if the pixel under test is a Gb pixel, the pixel under test is compared to other pixels in neighboring Gb pixel tiles.

In some embodiments, the pixel under test is compared to pixels in neighboring tiles to generate a first defective pixel indication 522. For example, if the pixel under test is brighter or darker by a threshold amount than every pixel being compared to, the neighboring tiles pixels comparator 520 outputs the first defective pixel indication 522 having a first value. In some embodiments, the first defective pixel indication 522 is outputted having the first value if the pixel under test is brighter or darker by the threshold amount than at least a first predetermined number of pixels being compared to. Alternatively, if the pixel under test is not brighter or darker by a threshold amount than one or more pixels being compared to, the neighboring tiles pixels comparator 520 outputs the first defective pixel indication 522 having a second value.

The co-tile pixels comparator 525 is a circuit that compares the pixel under test to other pixels within the same tile as the pixel under test. For example, in a quadra configuration where each tile has four pixels, the pixel under test is compared to the other three pixels in the same tile as the pixel under test. In some embodiments, the pixel under test is compared to other pixels in the same tile to generate a second defective pixel indication 528. If the pixel under test is brighter or darker than each of the other pixels in the same tile as the pixel under test, the co-tile comparator 525 outputs the second defective pixel indication 528 having the first value. In some embodiments, the second defective pixel indication is outputted having the first value if the pixel under test is brighter or darker than at least a second predetermined number of other pixels in the same tile as the pixel under test. Alternatively, if the pixel under test is not brighter or darker than one or more of the other pixels in the same tile as the pixel under test, the co-tile comparator 525 outputs the second defective pixel indication 528 having the second value.

The pixel classifier 530 is a circuit that determines whether the pixel under test is defective based on the first and second defective pixel indications. In some embodiments, the pixel classifier 530 generates a signal 532 indicating that the pixel under test is defective if both the first defective pixel indication 522 generated by the neighboring tiles pixels comparator 520 and the second defective pixel indication 528 generated by the co-tile pixels comparator 525 have the first value. Alternatively, if either the first defective pixel indication 522 generated by the neighboring tiles pixels comparator 520 or the second defective pixel indication 528 generated by the co-tile pixels comparator 525 has the second value, the pixel classifier 530 generates a signal indicating that the pixel under test is not defective.

Referring back to FIG. 5, the defective pixel corrector 550 includes a gradient detector 560 and a pixel interpolator 570. The gradient detector 560 is a circuit that determines a gradient direction 562 for the pixel under test. In some embodiments, the gradient detector 560 determines four gradient values based on corresponding sets of pixels surrounding the pixel under test. For example, the gradient detector 560 determines a horizontal gradient value based on a first set of pixels surrounding the pixel under test, a vertical gradient value based on a second set of pixels surrounding the pixel under test, a first diagonal (45 degrees diagonal) gradient value based on a third set of pixels surrounding the pixel under test, and a second diagonal (135 degree diagonal) gradient value based on a fourth set of pixels surrounding the pixel under test.

The pixel interpolator 570 is a circuit that determines a value to replace the pixel value of a defective pixel by interpolating two or more neighboring pixels. In some embodiments, the pixel interpolator further determines the value to replace the pixel value of the defective pixel base on a linear filter correction value. For example, the pixel interpolator determines the value to replace the pixel value of the defective pixel by determining a weighted average of the linear filter correction value and the value determined by interpolating the two or more neighboring pixels.

In some embodiments, the pixel interpolator 570 selects two or more pixels to interpolate based on the gradient direction 562 determined by the gradient director 560. For example, if the gradient detector 560 detects that the pixel under test is in a horizontal gradient, the pixel interpolator 570 selects pixels to the right and left of the pixel under test to generate the pixel value to replace the pixel value of the pixel under test. In some embodiments, the pixel interpolator 570 selects pixels to the right and left of the pixel under test associated with the same color as the pixel under test. Similarly, if the gradient detector 560 detects that the pixel under test is in a vertical gradient, the pixel interpolator 570 selects pixels above and below the pixel under test to generate the pixel value to replace the pixel value of the pixel under test. If the gradient detector 560 detects that the pixel under test detects that the pixel under test is in a first diagonal gradient, the pixel interpolator 570 selects pixels across a top-right direction and a bottom-left direction of the pixel under test to generate the pixel value to replace the pixel value of the pixel under test. If the gradient detector 560 detects that the pixel under test detects that the pixel under test is in a second diagonal gradient, the pixel interpolator 570 selects pixels across a top-left direction and a bottom-right direction of the pixel under test to generate the pixel value to replace the pixel value of the pixel under test.

Example Process for Processing Defective Pixels

Figure 6:
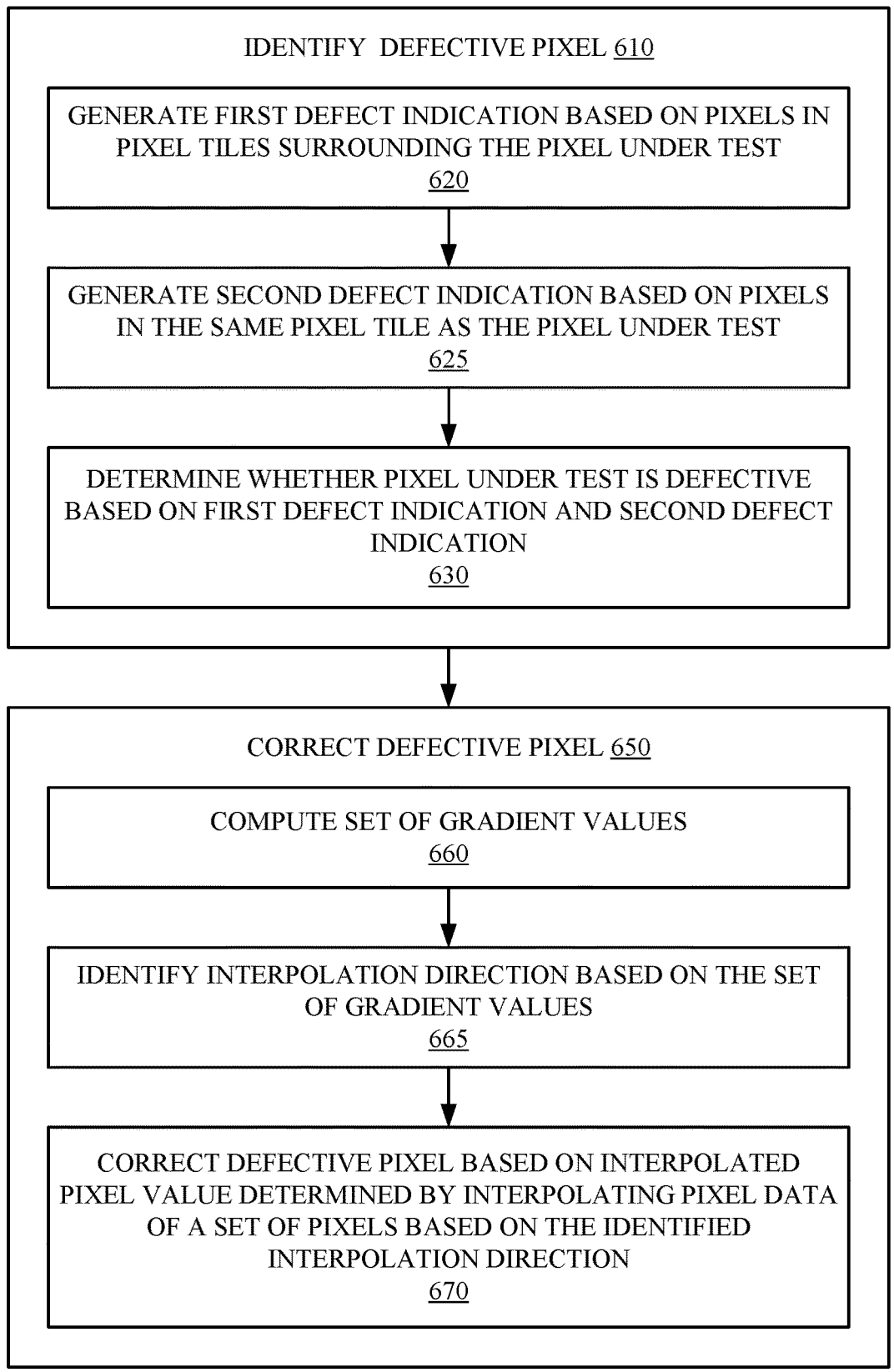
FIG. 6 is a flowchart illustrating a method for processing defective pixels in an image captured using a quadra image sensor, according to one or more embodiments.

FIG. 6 is a flowchart illustrating a method for processing defective pixels in an image captured using a quadra image sensor, according to one or more embodiments. The method may include additional or fewer steps, and steps may be performed in different orders. The method may be performed by the PDC circuit 500 of FIG. 5. In some embodiments, the process 600 of FIG. 6 is performed for each pixel in an image.

In some embodiments, the process for processing defective pixels is divided into a detection step 610 and a correction step 650. For example, for each pixel in an image captured using a quadra image sensor, the defective pixel detector 510 identifies 610 whether the pixel is a defective pixel. If the defective pixel detector 510 identifies the pixel as a defective pixel, the defective pixel corrector 550 corrects 650 the defective pixel.

Figure 7:
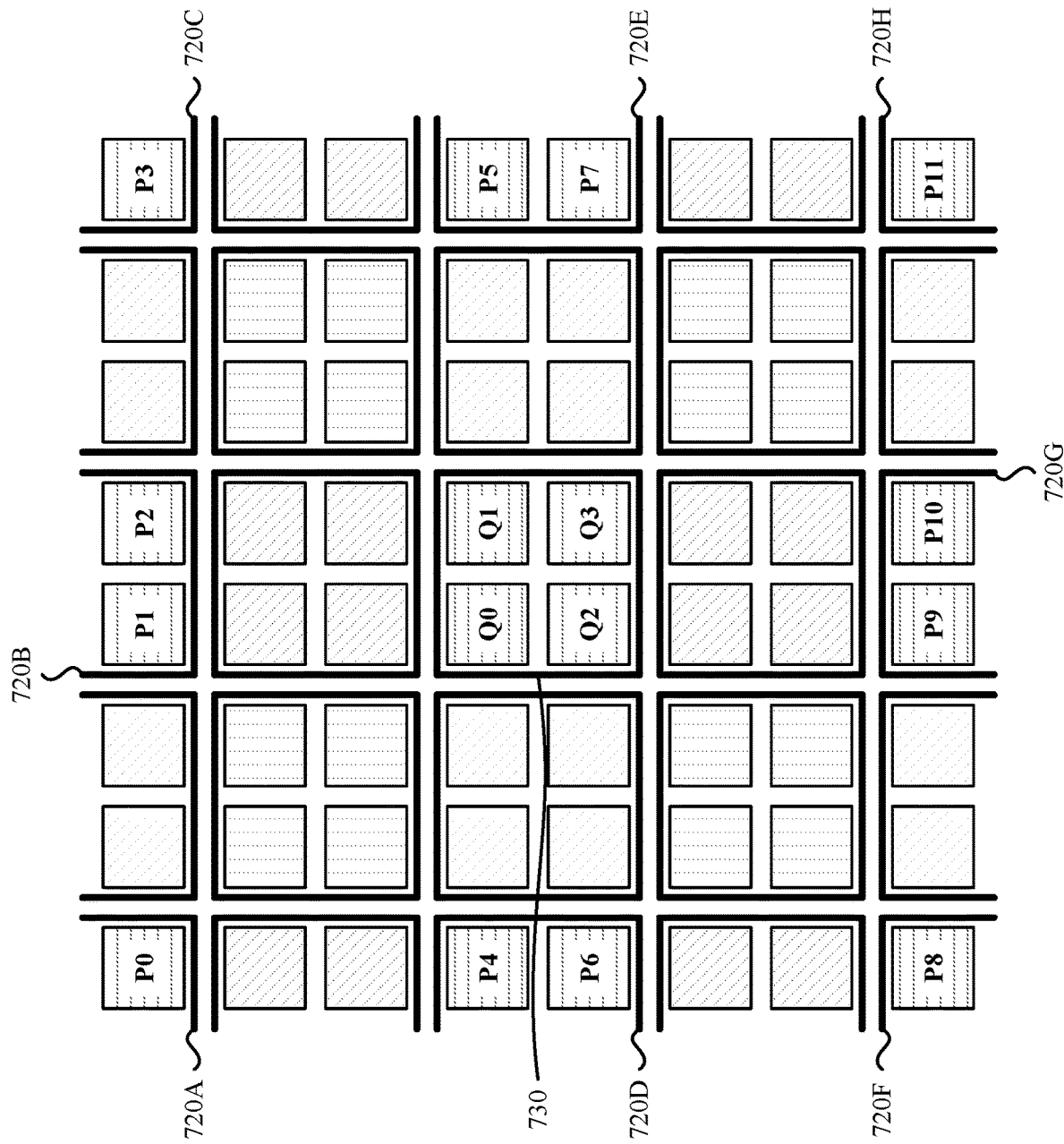
FIG. 7 illustrates a plan view showing a pixel configuration for determining whether a pixel is defective, according to one or more embodiments.

During the detection step, the neighboring tiles pixels comparator 520 generates 620 a first defective pixel indication based on pixels in pixels tiles surrounding the pixel under test. In some embodiments, the neighboring tiles pixels comparator 520 generates the first defective pixel indication based on the 12 nearest same color pixels that are not in the same tile as the pixel under test. FIG. 7 illustrates a plan view showing a pixel configuration for determining whether a pixel is defective, according to one or more embodiments. FIG. 7 illustrates a pixel tile 730 having pixels Q0 through Q3. When any pixel in pixel tile 730 is being tested (i.e., when a pixel in pixel tile 730 is a pixel under test), the pixel being tested is compared to pixels in surrounding pixel tiles 720A through 720H. In particular, surrounding pixel tiles 720A through 720H are pixel tiles corresponding to the same color as pixel tile 730.

In some embodiments, when a pixel in pixel tile 730 is tested, the pixel is compared to pixels closest to the pixel tile 730. That is, the pixel under test is compared to pixels P0 through P11. Pixel P0 is the lower-left pixel (fourth channel) of the first pixel tile 720A located on the upper-left diagonal from the pixel tile 730. Pixels P1 and P2 are the lower pixels (third and fourth channels respectively) of the second pixel tile 720B located above the pixel tile 730. Pixel P3 is the lower-left pixel (third channel) of the third pixel tile 720C located on the upper-right diagonal from the pixel tile 730. Pixels P4 and P6 are the right pixels (second and fourth channels respectively) of the fourth pixel tile 720D located left of the pixel tile 730. Pixels P5 and P7 are the left pixels (first and third channels respectively) of the fifth pixel tile 720E located right of the pixel tile 730. Pixel P8 is the upper-right pixel (second channel) of the sixth pixel tile 720F located on the lower-left diagonal from the pixel tile 730. Pixels P9 and P10 are the top pixels (first and second channels respectively) of the seventh pixel tile 720G located below the pixel tile 730. Pixel P11 is the upper-left pixel (first channel) of the eighth pixel tile 720H.

Referring back to FIG. 6, the co-tile pixels comparator 525 generates 625 a second defective pixel indication based pixels in the same pixel tile as the pixel under test. In some embodiments, if the pixel under test is a first pixel channel Q0 in the pixel tile 730, the co-pixel comparator 525 compares the pixel under test to the second pixel channel Q1, the third pixel channel Q2, and the fourth pixel channel Q3 in the same pixel tile 730 as the pixel under test. Similarly, if the pixel under test is a second pixel channel Q1 in the pixel tile 730, the co-pixel comparator 525 compares the pixel under test to the first pixel channel Q0, the third pixel channel Q2, and the fourth pixel channel Q3 in the same pixel tile 730 as the pixel under test. Moreover, if the pixel under test is a third pixel channel Q2 in the pixel tile 730, the co-pixel comparator 525 compares the pixel under test to the first pixel channel Q0, the second pixel channel Q1, and the fourth pixel channel Q3 in the same pixel tile 730 as the pixel under test. If the pixel under test is a fourth pixel channel Q3 in the pixel tile 730, the co-pixel comparator 525 compares the pixel under test to the first pixel channel Q0, the second pixel channel Q1, and the third pixel channel Q2 in the same pixel tile 730 as the pixel under test.

Based on the first defective pixel indication and the second defective pixel indication, the pixel classifier 530 determines 630 whether the pixel under test is a defective pixel. In some embodiments, the pixel classifier 530 determines that the pixel under test is defective if both the first defective pixel indication generated by the neighboring tiles pixels comparator 520 and the second defective pixel indication generated by the co-tile pixels comparator 525 indicate that the pixel is defective.

During the correction step 650, the gradient detector 560 computes 660 a set of gradient values. In some embodiments, the gradient detector 560 determines a horizontal gradient value, a vertical gradient value, a first diagonal (45°) gradient value, and a second diagonal (135°) gradient value.

Figure 8A:
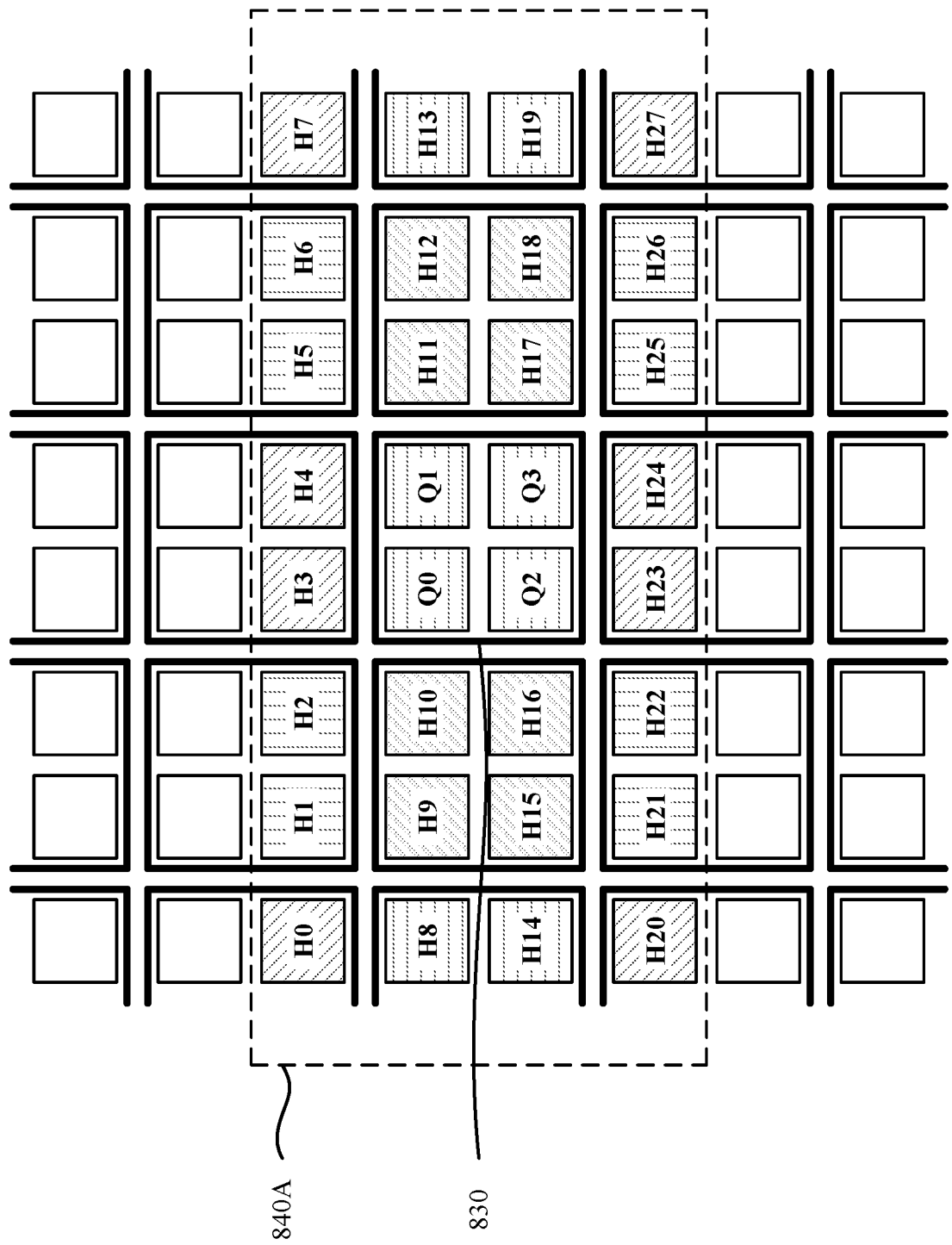
FIG. 8A illustrates a plan view showing a pixel configuration for determining a horizontal gradient value, according to one or more embodiments.
Figure 8B:
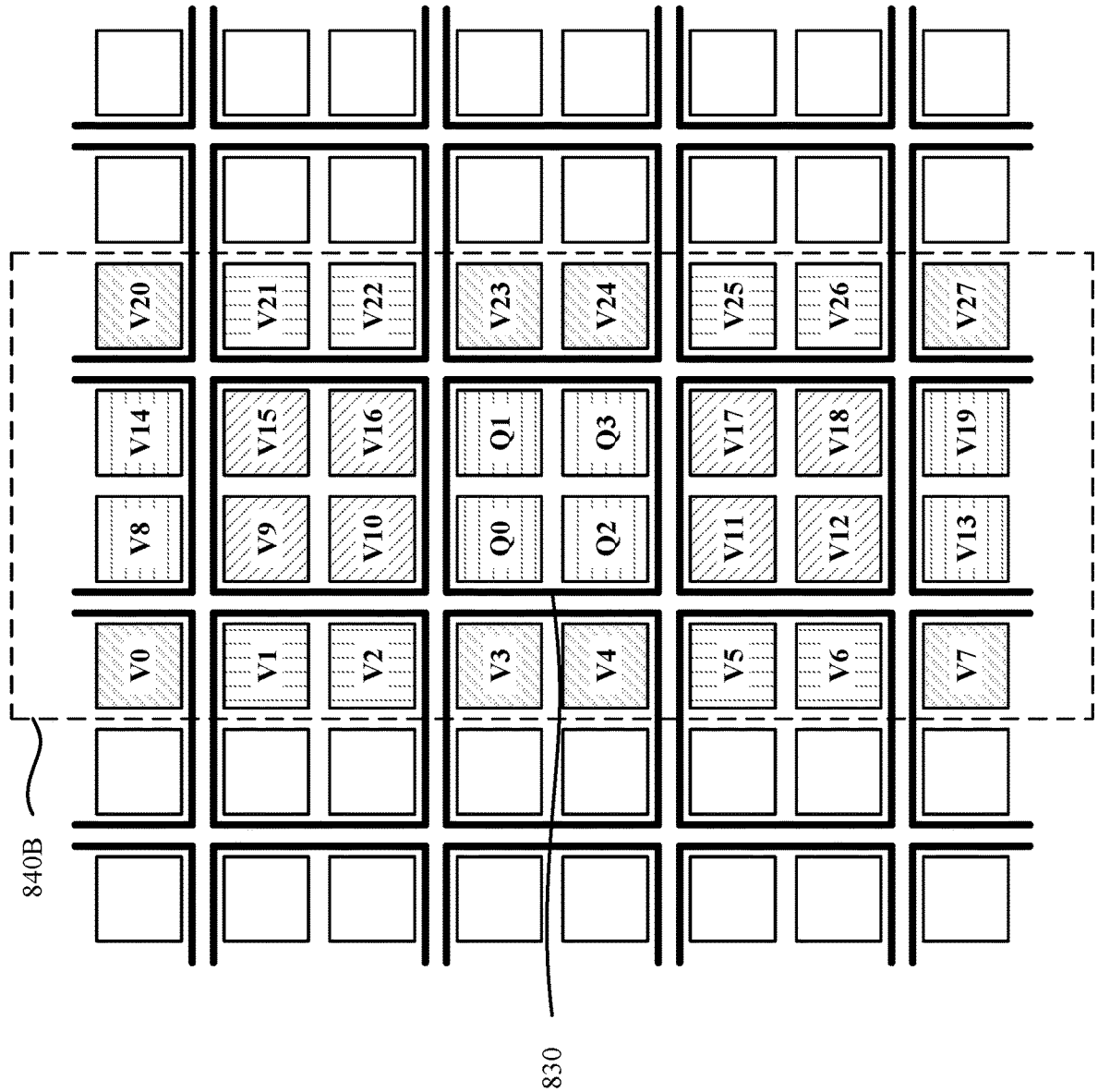
FIG. 8B illustrates a plan view showing a pixel configuration for determining a vertical gradient value, according to one or more embodiments.
Figure 8C:
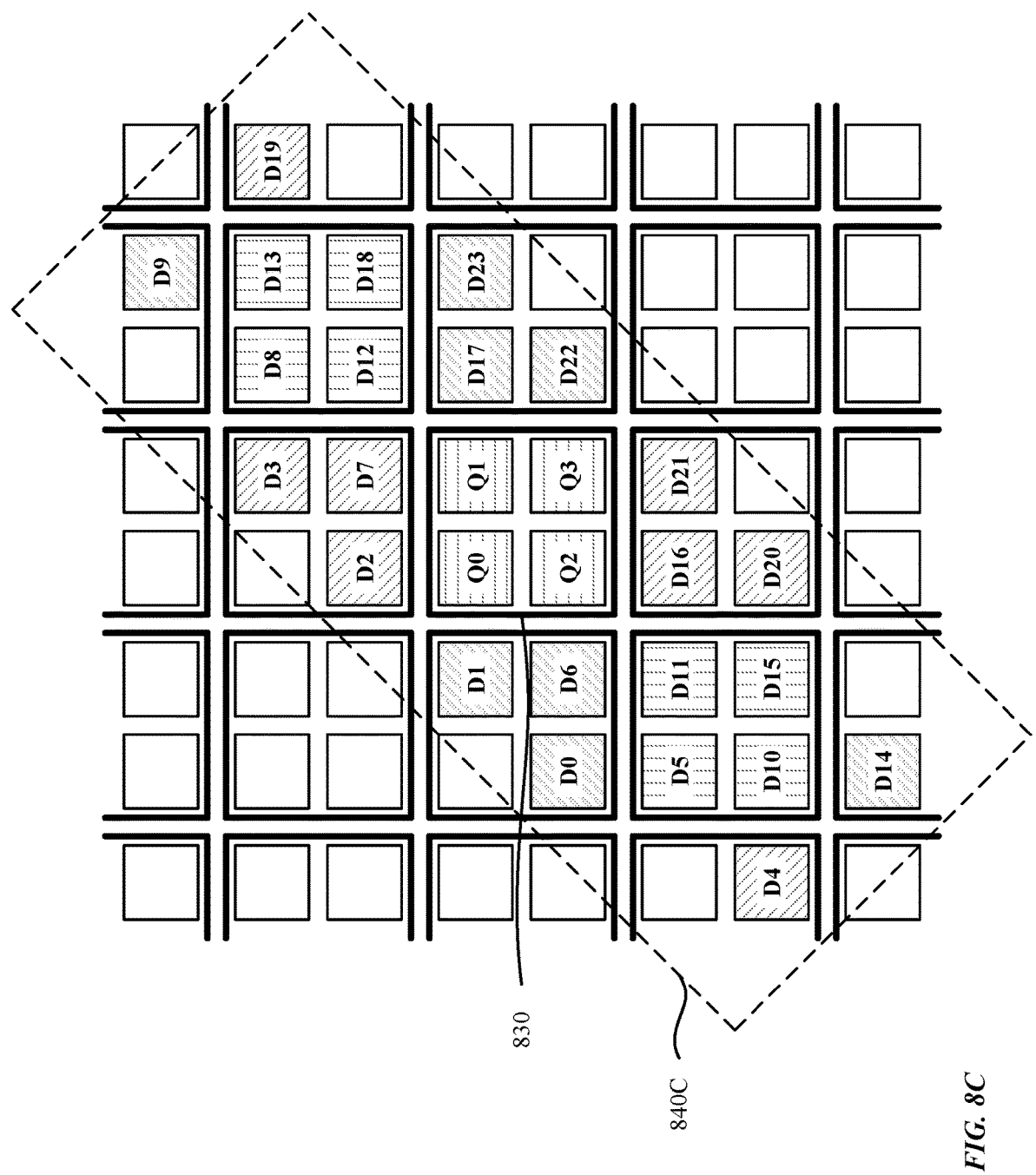
FIG. 8C illustrates a plan view showing a pixel configuration for determining a first diagonal (45°) gradient value, according to one or more embodiments.
Figure 8D:
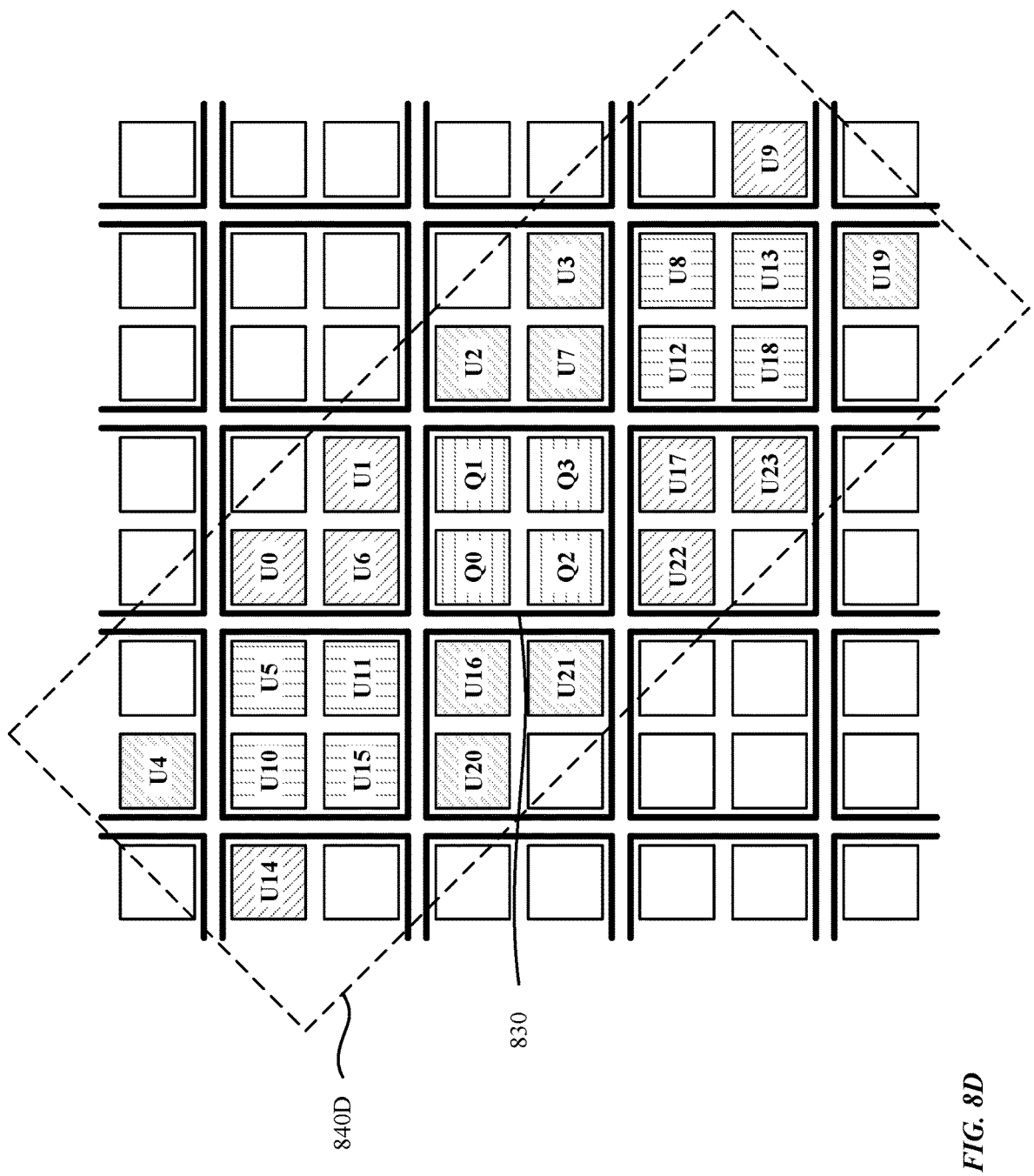
FIG. 8D illustrates a plan view showing a pixel configuration for determining a second diagonal (135°) gradient value, according to one or more embodiments.

FIG. 8A illustrates a plan view showing a pixel configuration for determining a horizontal gradient value, according to one or more embodiments. FIG. 8B illustrates a plan view showing a pixel configuration for determining a vertical gradient value, according to one or more embodiments. FIG. 8C illustrates a plan view showing a pixel configuration for determining a first diagonal (45°) gradient value, according to one or more embodiments. FIG. 8D illustrates a plan view showing a pixel configuration for determining a second diagonal (135°) gradient value, according to one or more embodiments.

In some embodiments, the horizontal gradient value is calculated using pixel values for pixels H0 through H27 shown in FIG. 8A. In some embodiments, a first gradient calculation matrix (or vector) is applied to the pixel values for pixels H0 through H27. The gradient calculation matrix may be configured to multiply each of the pixel values by a coefficient. The pixels H0 through H27 may be selected to be within a horizontal band 840A centered around the pixel tile 830 that includes the pixel under test. In some embodiments, additional or different pixels are used for determining the horizontal gradient value. For example, the horizontal pixel value may be determined using pixels included in a 12 by 6 horizontal band, instead of an 8 by 4 horizontal band as shown in FIG. 8A.

Similarly, the vertical gradient value is calculated using pixel values for pixels V0 through V27 shown in FIG. 8B. In some embodiments, a second gradient calculation matrix is applied to the pixel values for pixels V0 through V27. The pixels V0 through V27 are selected to be within a vertical band 840B centered around the pixel tile 830 that includes the pixel under test. In some embodiments, first and second gradient calculation matrices are the same matrices or rotated versions of one another. Alternatively, the gradient detector 560 may use different matrices for calculating the horizontal gradient value and the vertical gradient value.

Moreover, the first diagonal gradient value is calculated using pixel values for pixels D0 through D23 as shown in FIG. 8C and a third gradient matrix, and the second diagonal gradient value is calculated using pixel values for pixels U0 through U23 as shown in FIG. 8D and a fourth gradient matrix. The pixels D0 through D23 may be selected from a first diagonal band of pixels 840C centered around the pixel tile 830 that includes the pixel under test. In some embodiments, the first diagonal band of pixels 840C is rotated by 45° with respect to the horizontal band of pixels 840A used for determining the horizontal gradient value. Additionally, pixels U0 through U23 may be selected from a second diagonal band of pixels 840D centered around the pixel tile 830 that includes the pixel under test. In some embodiments, the second diagonal band of pixels 840D is rotated by 135° (or)–45° with respect to the horizontal band of pixels 840A used for determining the horizontal gradient value.

In some embodiments, the gradient detector 560 determines each of the gradients by determining an average of a set of absolute differences based a corresponding set of pixels. That is, the gradient detector 560 may determine the horizontal gradient by determining an average of a set of absolute differences using pixels H0 through H27, may determine the vertical gradient by determining an average of a set of absolute differences using pixels V0 through V27, may determine the first diagonal gradient by determining an average of a set of absolute differences using pixels D0 through D23, and may determine the second diagonal gradient by determining an average of a set of absolute differences using pixels U0 through U23.

In some embodiments, one or more absolute differences are the difference between at least a first pixel and a second pixel of the same color. In some embodiments, one or more absolute differences are the difference between the sum of a first pixel and a second pixel, and the sum of a third pixel and a fourth pixel, all of the same color. For example, the horizontal gradient may be calculated by determining eight absolute difference G1 through G8 as:

$$G1 = |H0 - H3 + H4 - H7| \quad (1)$$

$$G2 = |H9 - H10 + H11 - H12| \quad (2)$$

$$G3 = |H15 - H16 + H17 - H18| \quad (3)$$

$$G4 = |H20 - H23 + H24 - H27| \quad (4)$$

-continued $$G5 = |H1 - H2 + H5 - H6| \quad (5)$$
$$G6 = |H21 - H22 + H25 - H26| \quad (6)$$
$$G7 = |H8 - H13| \quad (7)$$
$$G8 = |H14 - H19| \quad (8)$$

In this example, the first and fourth absolute differences are determined using pixels of a first color, the second and third absolute differences are determined using pixels of a second color, the fifth and sixth absolute differences are determined using pixels of a third color, and the seventh and eighth absolute differences are determined using pixels of a fourth color.

Referring back to FIG. 6, the pixel interpolator 570 identifies 665 an interpolation direction based on the set of gradient values. In some embodiments, the pixel interpolator 570 identifies the interpolation direction by comparing the gradient values calculated by the gradient detector 560 to each other. For example, the pixel interpolator 570 selects the largest between the horizontal gradient value, the vertical gradient value, the first diagonal gradient value, and the second diagonal gradient value, and identifies the interpolation direction as the direction corresponding to the smallest gradient value.

The pixel interpolator 570 additionally corrects 670 the defective pixel based on an interpolated pixel value determined by interpolating the pixel data of a set of pixels based on the identified interpolation direction. In some embodiments, the pixel interpolator 570 further corrects the defective pixel based on a linear filter correction value. For example, the pixel interpolator 570 corrects the defective pixel by determining a weighted average of the linear filter correction value and the interpolated pixel value. A process for interpolating pixels is described in more detail hereinbelow in conjunction with FIG. 9. A process for determining the linear filter correction value is described in more detail hereinbelow in conjunction with FIG. 10.

Figure 9:
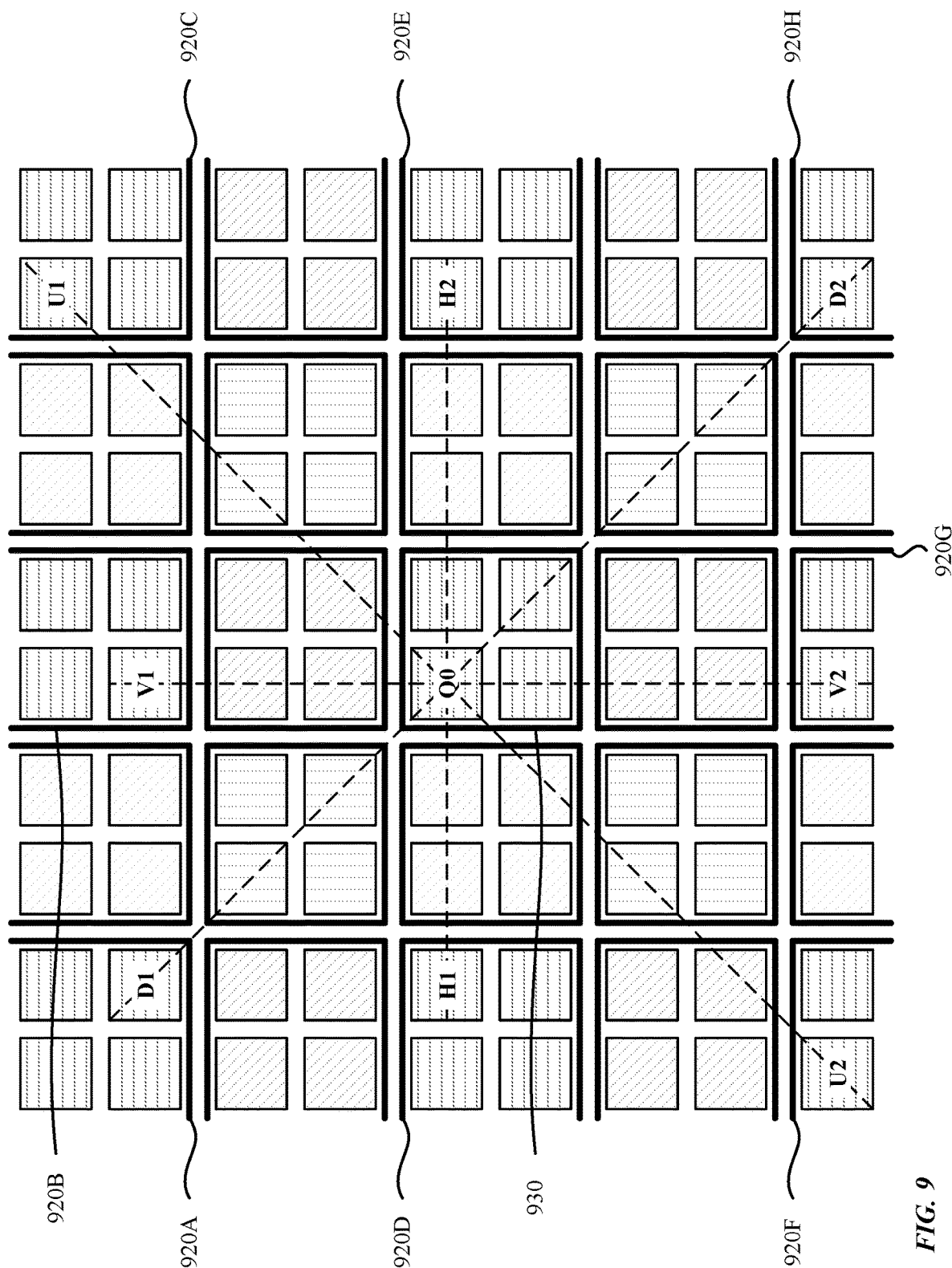
FIG. 9 illustrates a plan view showing a pixel configuration for interpolating pixels to correct a defective pixel, according to one or more embodiments.

FIG. 9 illustrates a plan view showing a pixel configuration for interpolating pixels to correct a defective pixel Q0 in a pixel tile 930, according to one or more embodiments. The configuration shown in FIG. 9 may be rotated or flipped to correct other pixels of the pixel tile 930. For example, to correct the second pixel Q1 (upper right pixel) of the pixel tile 930, the configuration shown in FIG. 9 is flipped horizontally. Moreover, to correct the third pixel Q2 (lower left pixel) of the pixel tile 930, the configuration shown in FIG. 9 is flipped vertically. Additionally, to correct the fourth pixel Q4 (lower right pixel) of the pixel tile 930, the configuration shown in FIG. 9 is flipped both horizontally and vertically.

To correct the pixel Q0, a set of pixels are selected based on the identified interpolation direction. For example, the pixel interpolator 570 selects a first interpolation pixel and a second interpolation pixel based on the identified interpolation direction. In the configuration shown in FIG. 9, if the identified interpolation direction is the horizontal direction, the pixel interpolator 570 selects pixels H1 and H2 that are located in the same horizontal line as the pixel Q0 being corrected. For example, pixel H1 is the second (upper right) pixel from the pixel tile 920D to the left of the pixel tile 930 that includes the pixel Q0 being corrected and corresponding to the same color as the pixel being corrected; and pixel H2 is the first (upper left) pixel from the pixel tile 920E to the right of the pixel tile 930 that include the pixel Q0 being corrected and corresponding to the same color as the pixel being corrected.

Moreover, if the identified interpolation direction is the vertical direction, the pixel interpolator 570 selects pixels V1 and V2 that are located in the same vertical line as the pixel Q0 being corrected. For example, pixel V1 is the third (bottom left) pixel from the pixel tile 920B above the pixel tile 930 that include the pixel Q0 being corrected and corresponding to the same color as the pixel being corrected; and pixel V2 is the first (upper left) pixel from the pixel tile 920G below the pixel tile 930 that include the pixel Q0 being corrected and corresponding to the same color as the pixel being corrected.

In addition, if the identified interpolation direction is the first diagonal direction (45°), the pixel interpolator 570 selects pixels U1 and U2 that are located in the same diagonal line as the pixel Q0 being corrected. For example, pixel U1 is the first (top left) pixel from the pixel tile 920C above and to the right of the pixel tile 930 that include the pixel Q0 being corrected and corresponding to the same color as the pixel being corrected; and pixel U2 is the first (upper left) pixel from the pixel tile 920F below and to the left of the pixel tile 930 that include the pixel Q0 being corrected and corresponding to the same color as the pixel being corrected.

Furthermore, if the identified interpolation direction is the second diagonal direction (135°), the pixel interpolator 570 selects pixels D1 and D2 that are located in the same diagonal line as the pixel Q0 being corrected. For example, pixel D1 is the fourth (bottom right) pixel from the pixel tile 920A above and to the left of the pixel tile 930 that include the pixel Q0 being corrected and corresponding to the same color as the pixel being corrected; and pixel D2 is the first (upper left) pixel from the pixel tile 920H below and to the right of the pixel tile 930 that include the pixel Q0 being corrected and corresponding to the same color as the pixel being corrected.

The pixel interpolator 570 then determines the interpolated pixel value by interpolating the selected interpolation pixels. In some embodiments, the pixel interpolator 570 interpolates the selected interpolation pixels by determining an average of the selected pixels. Alternatively, the pixel interpolator 570 interpolates the selected interpolation pixels by determining a weighted average of the selected pixels based on the distance between the selected pixels and the pixel being corrected.

Figure 10:
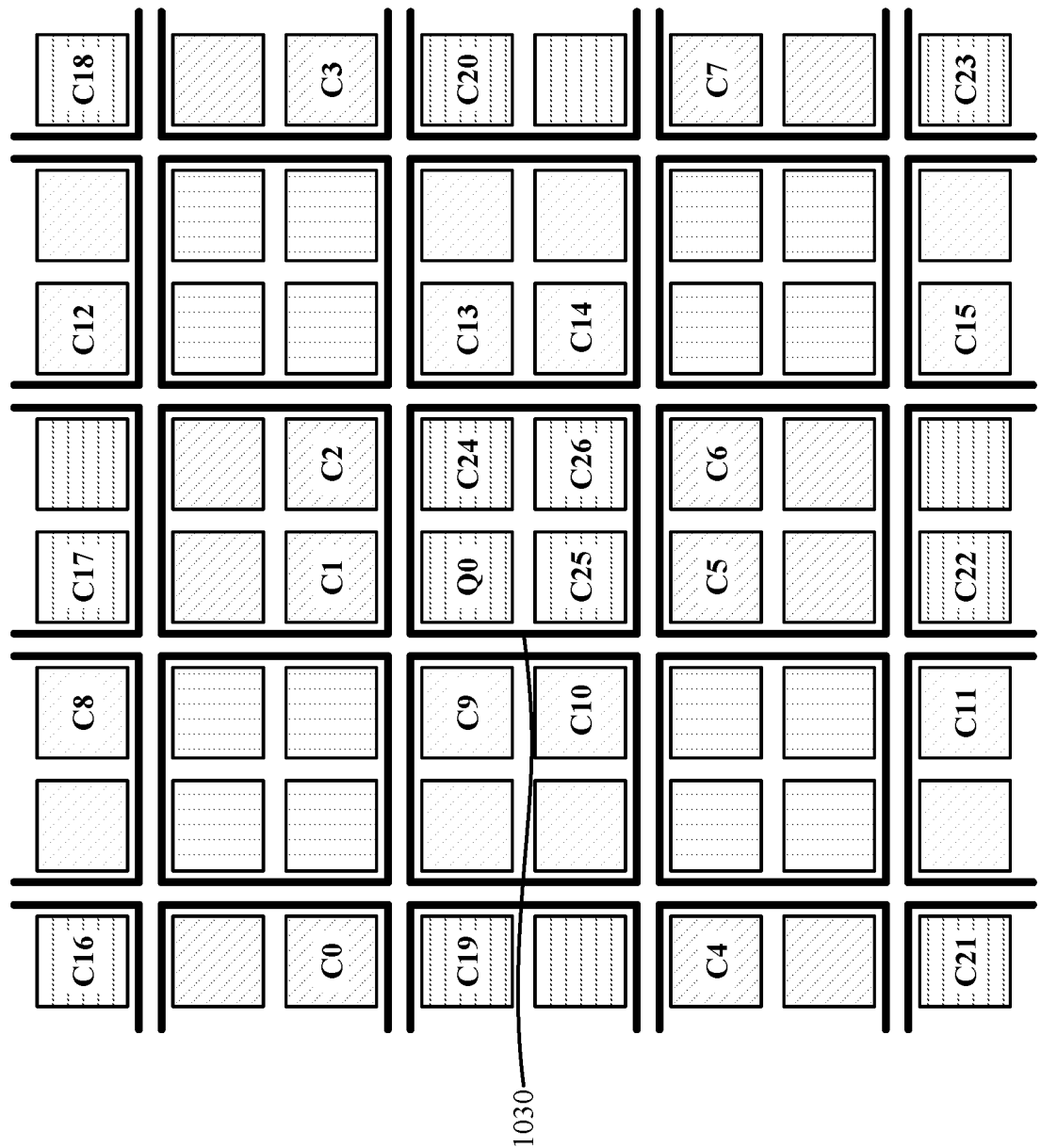
FIG. 10 illustrates a plan view showing a pixel configuration for determining the linear filter correction value to correct a defective pixel in a pixel tile, according to one or more embodiments.

FIG. 10 illustrates a plan view showing a pixel configuration for determining the linear filter correction value to correct a defective pixel Q0 in a pixel tile 1030, according to one or more embodiments. The configuration shown in FIG. 10 may be rotated or flipped to correct other pixels of the pixel tile 1030. For example, to correct the second pixel Q1 (upper right pixel) of the pixel tile 1030, the configuration shown in FIG. 10 is flipped horizontally. Moreover, to correct the third pixel Q2 (lower left pixel) of the pixel tile 1030, the configuration shown in FIG. 10 is flipped vertically. Additionally, to correct the fourth pixel Q4 (lower right pixel) of the pixel tile 1030, the configuration shown in FIG. 10 is flipped both horizontally and vertically.

In some embodiments, to determine the linear filter correction value, the pixel interpolator 570 multiples the pixel values of pixels surrounding the defective pixel Q0 by a filter matrix. For example, the pixel values of pixels surrounding the defective pixel Q0 are multiplied by a sparse 9 by 9 matrix. In some embodiments, the filter matrix has non-zero values at specific locations and has zeros elsewhere. For example, the filter matrix may have non-zero values at locations corresponding to pixels C0 through C26 shown in FIG. 10.

While the embodiments herein are described with respect to processing of an image captured using a quadra sensor (i.e., having 2-by-2 pixel tiles of the same color), the principles described herein can be applied to image sensors having other pixel tile configurations (e.g., 3-by-3 or 4-by-4 pixel tiles). Moreover, throughout the specification, Gr pixels (green pixels located in the same row as red pixels) and Gb pixels (green pixels located in the same row as blue pixels) are treated as being of different colors. That is, Gr and Gb are considered to be different colors. However, the described embodiments are not limited thereto and the principles described herein can be applied to a configurated where Gr and Gb pixels are considered to be of the same color.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A circuit for processing pixels of an image, comprising:
 a first comparator configured to generate a first defect indication by determining whether pixel data of a pixel under test is brighter or darker by a first threshold value than pixel data of pixels in pixel tiles surrounding the pixel tile corresponding to the pixel under test, each pixel tile comprising an array of pixels having a same color;
 a second comparator configured to generate a second defect indication by determining whether pixel data of the pixel under test is brighter or darker by a second threshold value than pixel data of other pixels in the pixel tile corresponding to the pixel under test; and
 a pixel classifier circuit configured to identify the pixel data of the pixel under test as defective responsive to the first defect indication and the second defect indication being true.

2. The circuit of claim 1, further comprising:
 a gradient detector circuit configured to:
  compute a plurality of gradient values, each gradient value based on pixel data for a corresponding set of pixels surrounding the pixel under test,
  identify an interpolation direction based on the computed set of gradient values; and
 a pixel interpolator circuit configured to correct the pixel data of the pixel under test by interpolating pixel data of pixels selected based on the identified interpolation direction.

3. The circuit of claim 2, wherein the plurality of gradient values comprises a horizontal gradient value determined based on a first plurality of pixels, a vertical gradient value determined based on a second plurality of pixels, a first diagonal gradient value determined based on a third plurality of pixels, and a second diagonal gradient determined based on a fourth plurality of pixels.

4. The circuit of claim 3, wherein:
 the first plurality of pixels includes pixels of a pixel tile located to the left of the pixel tile corresponding to the pixel under test, and pixels of a pixel tile located to the right of the pixel tile corresponding to the pixel under test;
 the second plurality of pixels includes pixels of a pixel tile located above the pixel tile corresponding to the pixel under test, and pixels of a pixel tile located below the pixel tile corresponding to the pixel under test;
 the third plurality of pixels includes pixels of a pixel tile located above and to the right of the pixel tile corresponding to the pixel under test, and pixels located below and to the left of the pixel tile corresponding to the pixel under test; and
 the fourth plurality of pixels includes pixels of a pixel tile located above and to the left of the pixel tile corresponding to the pixel under test, and pixels located below and to the right of the pixel tile corresponding to the pixel under test.

5. The circuit of claim 2, wherein the horizontal gradient value is an average of a set of absolute differences, wherein each absolute difference is a difference between at least a first pixel and a second pixel of a same color.

6. The circuit of claim 5, wherein one or more absolute differences are a difference between (a) a sum of the first pixel and a third pixel, and (b) a sum of the second pixel and a fourth pixel, wherein the first pixel, second pixel, third pixel, and fourth pixel are of a same color.

7. The circuit of claim 2, wherein the gradient detector circuit identifies an interpolation direction based on the computed set of gradient values by:
 identifying a smallest gradient value of plurality of gradient values; and
 identifying the interpolation direction corresponding to the smallest gradient value.

8. The circuit of claim 2, wherein the gradient detector circuit computes the plurality of gradient values by:
 applying a horizontal gradient calculation matrix to a set of pixels centered at the pixel under test;
 applying a vertical gradient calculation matrix to the set of pixels centered at the pixel under test;
 applying a first diagonal gradient calculation matrix to the set of pixels centered at the pixel under test; and
 applying a second diagonal gradient calculation matrix to the set of pixels centered at the pixel under test.

9. The circuit of claim 8, wherein the gradient detector circuit selects the horizontal gradient calculation matrix, the vertical gradient calculation matrix, the first diagonal gradient calculation matrix, and the second diagonal gradient calculation matrix based on a color of the pixel under test.

10. The circuit of claim 2, wherein the pixel interpolator is further configured to correct the pixel data of the pixel under test based on a linear filter correction value determined based on a combination of pixels surrounding the pixel under test and selected based on a position of the pixel under test.

11. The circuit of claim 10, wherein the pixel interpolator is further configured to correct the pixel data of the pixel under test by determining a weighted average of the interpolated pixel data of the pixels selected based on the identified interpolation direction and the linear filter correction value.

12. A method for processing pixels of an image, comprising:
 generating a first defect indication by determining whether pixel data of a pixel under test is brighter or darker by a first threshold value than pixel data of pixels in pixel tiles surrounding the pixel tile corresponding to the pixel under test, each pixel tile comprising an array of pixels having a same color;

generating a second defect indication by determining whether pixel data of the pixel under test is brighter or darker by a second threshold value than pixel data of other pixels in the pixel tile corresponding to the pixel under test; and identifying the pixel data of the pixel under test as defective responsive to the first defect indication and the second defect indication being true.

13. The method of claim 12, further comprising:

computing a plurality of gradient values, each gradient value based on pixel data for a corresponding set of pixels surrounding the pixel under test;

identifying an interpolation direction based on the computed set of gradient values; and correcting the pixel data of the pixel under test by interpolating pixel data of pixels selected based on the identified interpolation direction.

14. The method of claim 13, wherein the plurality of gradient values comprises a horizontal gradient value determined based on a first plurality of pixels, a vertical gradient value determined based on a second plurality of pixels, a first diagonal gradient value determined based on a third plurality of pixels, and a second diagonal gradient determined based on a fourth plurality of pixels.

15. The method of claim 14, wherein:

the first plurality of pixels includes pixels of a pixel tile located to the left of the pixel tile corresponding to the pixel under test, and pixels of a pixel tile located to the right of the pixel tile corresponding to the pixel under test;

the second plurality of pixels includes pixels of a pixel tile located above the pixel tile corresponding to the pixel under test, and pixels of a pixel tile located below the pixel tile corresponding to the pixel under test;

the third plurality of pixels includes pixels of a pixel tile located above and to the right of the pixel tile corresponding to the pixel under test, and pixels located below and to the left of the pixel tile corresponding to the pixel under test; and the fourth plurality of pixels includes pixels of a pixel tile located above and to the left of the pixel tile corresponding to the pixel under test, and pixels located below and to the right of the pixel tile corresponding to the pixel under test.

16. The method of claim 13, wherein the horizontal gradient value is an average of a set of absolute differences, wherein each absolute difference is a difference between at least a first pixel and a second pixel of a same color.

17. The method of claim 16, wherein one or more absolute differences are a difference between (a) a sum of the first pixel and a third pixel, and (b) a sum of the second pixel and a fourth pixel, wherein the first pixel, second pixel, third pixel, and fourth pixel are of a same color.

18. The method of claim 13, wherein identifying an interpolation direction based on the computed set of gradient values comprises:

identifying a smallest gradient value of plurality of gradient values; and identifying the interpolation direction corresponding to the smallest gradient value.

19. The circuit of claim 13, wherein computing the plurality of gradient values comprises:

applying a horizontal gradient calculation matrix to a set of pixels centered at the pixel under test;

applying a vertical gradient calculation matrix to the set of pixels centered at the pixel under test;

applying a first diagonal gradient calculation matrix to the set of pixels centered at the pixel under test; and applying a second diagonal gradient calculation matrix to the set of pixels centered at the pixel under test.

20. The method of claim 19, wherein the horizontal gradient calculation matrix, the vertical gradient calculation matrix, the first diagonal gradient calculation matrix, and the second diagonal gradient calculation matrix are selected based on a color of the pixel under test.

21. The method of claim 13, wherein the pixel data of the pixel under test is further corrected based on a linear filter correction value determined based on a combination of pixels surrounding the pixel under test and selected based on a position of the pixel under test.

22. The circuit of claim 21, wherein the pixel data of the pixel under test is further corrected by determining a weighted average of the interpolated pixel data of the pixels selected based on the identified interpolation direction and the linear filter correction value.

23. A system for pixel conversion, comprising:

an image sensor configured to obtain an image, the image sensor comprising a plurality of pixel tiles, each pixel tile including a plurality of pixels corresponding to a same color; and a defect detection circuit configured to:

generate a first defect indication by determining whether pixel data of a pixel under test is brighter or darker by a first threshold value than pixel data of pixels in pixel tiles surrounding the pixel tile corresponding to the pixel under test;

generate a second defect indication by determining whether pixel data of the pixel under test is brighter or darker by a second threshold value than pixel data of other pixels in the pixel tile corresponding to the pixel under test; and identify the pixel data of the pixel under test as defective responsive to the first defect indication and the second defect indication being true.

24. The system of claim 23, further comprising:

a defect correcting circuit configured to:

compute a plurality of gradient values, each gradient value based on pixel data for a corresponding set of pixels surrounding the pixel under test;

identify an interpolation direction based on the computed set of gradient values; and correct the pixel data of the pixel under test by interpolating pixel data of pixels selected based on the identified interpolation direction.

25. The system of claim 24, wherein the defect correcting circuit is further configured to correct the pixel data of the pixel under test based on a linear filter correction value determined based on a combination of pixels surrounding the pixel under test and selected based on a position of the pixel under test.

26. The circuit of claim 25, wherein the defect correcting circuit is further configured to correct the pixel data of the pixel under test by determining a weighted average of the interpolated pixel data of the pixels selected based on the identified interpolation direction and the linear filter correction value.

\* \* \* \* \*